(12) United States Patent
Williams

(10) Patent No.: US 7,688,754 B2
(45) Date of Patent: Mar. 30, 2010

(54) TRIPLE PLAY SERVICES TESTER

(75) Inventor: John G. Williams, Roanoke, VA (US)

(73) Assignee: Acterna LLC, Germantown, MD (US)

( * ) Notice: Subject to any disclaimer, the term of this patent is extended or adjusted under 35 U.S.C. 154(b) by 267 days.

(21) Appl. No.: 11/832,856

(22) Filed: Aug. 2, 2007

(65) Prior Publication Data

US 2008/0031151 A1    Feb. 7, 2008

Related U.S. Application Data

(60) Provisional application No. 60/821,309, filed on Aug. 3, 2006.

(51) Int. Cl.
    *H04L 12/26* (2006.01)
(52) U.S. Cl. .................. 370/253; 370/241; 370/252; 370/493
(58) Field of Classification Search ............. 370/253, 370/490, 493, 468, 241, 252
    See application file for complete search history.

(56) References Cited

U.S. PATENT DOCUMENTS

| | | | |
|---|---|---|---|
| 5,570,355 A * | 10/1996 | Dail et al. ................ 370/352 |
| 5,867,483 A | 2/1999 | Ennis, Jr. et al. ........... 370/252 |
| 6,370,120 B1 | 4/2002 | Hardy ..................... 370/252 |
| 6,449,739 B1 | 9/2002 | Landan ..................... 714/47 |
| 6,577,648 B1 | 6/2003 | Raisanen et al. .......... 370/503 |
| 6,721,686 B2 | 4/2004 | Malmskog et al. ......... 702/186 |
| 6,741,569 B1 | 5/2004 | Clark ...................... 370/252 |
| 6,775,240 B1 | 8/2004 | Zhang et al. .............. 370/251 |
| 6,781,955 B2 * | 8/2004 | Leung ..................... 370/232 |
| 6,799,213 B1 | 9/2004 | Zhao et al. ................ 709/224 |
| 6,807,156 B1 | 10/2004 | Veres et al. .............. 370/252 |
| 6,819,924 B1 | 11/2004 | Ma et al. .................. 455/425 |
| 6,880,115 B2 | 4/2005 | Abraham et al. ........... 714/712 |
| 6,888,801 B1 | 5/2005 | Hock ....................... 370/252 |
| 6,947,750 B2 | 9/2005 | Kakani et al. ........... 455/452.2 |
| 6,957,255 B1 | 10/2005 | Schweitzer et al. ........ 709/223 |
| 6,985,945 B2 | 1/2006 | Farhat et al. .............. 709/224 |
| 7,010,598 B2 | 3/2006 | Sitaraman et al. ......... 709/224 |
| 7,058,048 B2 | 6/2006 | Clark ...................... 370/356 |
| 7,075,981 B1 | 7/2006 | Clark ...................... 375/224 |
| 7,076,547 B1 | 7/2006 | Black ...................... 709/224 |
| 7,085,230 B2 | 8/2006 | Hardy ..................... 370/232 |
| 7,099,281 B1 | 8/2006 | Conway ................... 370/252 |
| 7,111,204 B1 | 9/2006 | Couturier et al. ........... 714/39 |
| 7,116,717 B1 | 10/2006 | Eshet et al. ............. 375/240.25 |
| 2002/0087711 A1 * | 7/2002 | Leung ..................... 709/233 |

(Continued)

OTHER PUBLICATIONS

"Information technology—Generic coding of moving pictures and associated audio information: Systems", International Standard, ISO/IEC 13818-1, second edition, Dec. 1, 2000, p. 41.

(Continued)

*Primary Examiner*—Chi H Pham
*Assistant Examiner*—Robert Lopata
(74) *Attorney, Agent, or Firm*—Matthew A. Pequignot; Pequignot + Myers LLC

(57) ABSTRACT

A portable tester for testing mutual effects of multiple services received via a shared network access link includes service signaling means for simulating user premises devices. In one embodiment, the tester is a triple play services tester supporting three IP addresses at the same time.

14 Claims, 10 Drawing Sheets

U.S. PATENT DOCUMENTS

| | | | |
|---|---|---|---|
| 2002/0145979 A1 | 10/2002 | Baj | 370/242 |
| 2002/0177977 A1 | 11/2002 | Scarlat et al. | 702/186 |
| 2003/0107990 A1 | 6/2003 | Herschleb et al. | 370/229 |
| 2003/0223376 A1 | 12/2003 | Elliott et al. | 370/249 |
| 2004/0071095 A1 | 4/2004 | Raisanen | 370/252 |
| 2004/0165570 A1 | 8/2004 | Lee | 370/349 |
| 2004/0208129 A1 | 10/2004 | Old et al. | 370/241 |
| 2005/0265386 A1 | 12/2005 | Smith et al. | 370/466 |
| 2006/0050633 A1 | 3/2006 | Lee et al. | 370/229 |
| 2006/0050721 A1 | 3/2006 | Ganesan | 370/401 |
| 2006/0062216 A1 | 3/2006 | Li et al. | 370/389 |
| 2006/0067237 A1 | 3/2006 | Burns et al. | 370/241 |
| 2006/0088034 A1* | 4/2006 | Santitoro | 370/395.21 |
| 2006/0153174 A1* | 7/2006 | Towns-von Stauber et al. | 370/356 |
| 2006/0174035 A1* | 8/2006 | Tufail | 709/239 |
| 2006/0198634 A1 | 9/2006 | Ofalt et al. | 398/16 |
| 2006/0206422 A1 | 9/2006 | Mashinsky | 705/40 |
| 2006/0209701 A1 | 9/2006 | Zhang et al. | 370/249 |
| 2006/0215633 A1* | 9/2006 | Jennings et al. | 370/352 |
| 2006/0215636 A1 | 9/2006 | Corley et al. | 370/352 |
| 2007/0064620 A1* | 3/2007 | Defoort et al. | 370/252 |
| 2007/0070890 A1* | 3/2007 | Rojahn | 370/229 |
| 2007/0081459 A1* | 4/2007 | Segel et al. | 370/230 |
| 2007/0140138 A1* | 6/2007 | Goffin | 370/252 |
| 2007/0147292 A1* | 6/2007 | Van Ewijk et al. | 370/329 |
| 2007/0256096 A1* | 11/2007 | Wilhelm | 725/34 |
| 2007/0258464 A1* | 11/2007 | Hall et al. | 370/395.52 |
| 2007/0260776 A1* | 11/2007 | Rojahn | 710/36 |
| 2009/0022053 A1* | 1/2009 | Aimoto et al. | 370/230 |
| 2009/0080328 A1* | 3/2009 | Hu et al. | 370/230 |

OTHER PUBLICATIONS

"Digital Vuideo Broadcasting (DVB); Measurement guidelines for DVB systems", ETSI TR 101 290, v.1.2.1, May 2001; pp. 17-19.

Mark Itzkowitz, "InFocus: Triple play or triple problems?", Apr. 29, 2005, http://telephonyonline.com/access/marketing/triple_play_customers 042905/.

Rohner et al., "Interactions between TCP, UDP and Routine Protocols in Wireless Multi-hop Ad hoc Networks", Uppsala University, Sweden and University of Basel, Switzerland, [Online] 2005, pp. 1-8.

JDSU: "JDSU Adds FTTx Triple-Play Test Capability to Modular HST-3000 Handheld Field Tester", World's Technology News, [Online] Feb. 24, 2006, pp. 1-2.

* cited by examiner

TRIPLE PLAY SERVICES TESTER

CROSS-REFERENCE TO RELATED APPLICATIONS

The present invention claims priority from the Provisional Application Ser. No. 60/821,309 filed Aug. 3, 2006, which is incorporated herein by reference for all purposes.

TECHNICAL FIELD

The present invention relates to packet-based communications, and, in particular, to active testing of multiple services provided to a customer via a shared access link.

BACKGROUND OF THE INVENTION

The telecommunication networks provide a growing number of packet-based services, such as Voice over IP (VoIP), gaming, video conferencing, IP Radio (RoIP), IP Television (IPTV), including Broadcast TV (BTV), pay per view (PPV), video-on-demand (VOD), and interactive TV. These services all share parts of the same distribution network, and in the access portion of the network touching the residence, typically share that same last mile network. In this shared environment, they may interact with each other in a negative manner. Each service has unique quality-of-service (QoS) needs. Various class-of-service (CoS) mechanisms are implemented in the networks to manage these needs. Available assessment tools typically monitor and analyze network-level service performance in terms of Quality of Service (QoS) or compliance such as with service level agreements (SLAs), using packet-based measurements such as jitter, loss, and delay for a single service.

Triple Play services deployed by service providers include services of three different service types: voice, video, and data, wherein the voice service is usually a VoIP service, the data services include email, internet browsing, FTP, etc., and the video services, also called IP Video or IPTV, include BTV, VOD, PPV. Services of the different types are typically provided to a subscriber simultaneously over various distribution networks. In those deployments where the technology used in the "last mile" of the access link has limited band width, for example ADSL or VDSL copper based access links, the demand for band width by the individual services could impact another service or can exceed the available band width. As an example, a subscriber is using a PC to access the public internet with the Data service, one or more VoIP calls are present, and a TV is turned on to access the IP Video service.

As the three different services travel across the distribution networks and, in particular, the access portion to the subscriber's premise and end point equipment, it is critical that the voice and video services meet the QoS parameters specific to each service in order to deliver the proper Quality-of-Experience (QoE) to the subscriber.

In today's telco test environment, the three components of the triple play services are tested individually. Known in the art are devices and methods for measuring QoS parameters for a single service, such as U.S. Pat. No. 6,888,801 issued May 3, 2005 to Hock and U.S. Pat. No. 6,985,945 issued Jan. 10, 2006 to Farhat et al. for voice, and U.S. Pat. No. 6,880,115 issued Apr. 12, 2005 to Abraham et al. and U.S. Pat. No. 7,010,598 issued Mar. 7, 2006 to. Sitaraman et al. for video. However, the interaction between services is not tested and validation of the Class-of-Service (CoS) mechanisms is not accomplished, therefore new service installations and troubleshooting procedures may miss important interactions effecting the QoE.

Passive monitoring of more than one service received together is disclosed in U.S. Patent Applications Nos. 20060198634 published Sep. 7, 2006 in the name of Ofalt et al. and 20060062216 published Mar. 23, 2006 in the name of Li et al.

The Ofalt reference teaches a multi-frequency tap apparatus for testing passive optical networks, which taps off a small amount of power without interrupting transmission to measure loss of optical power on the physical layer. In one embodiment the apparatus is a Triple Play Power Meter (TPPM), testing only power levels for the optical frequencies associated with components of the triple play service.

The Li reference discloses an apparatus consisting of a splitter and a switching fabric between an ingress and egress, so that at least some packets are copied to a QoS measuring block. The ingress receives packets of different types and QoS parameters are measured among one or more groups of packets.

The apparatuses disclosed in the aforementioned two applications provide passive monitoring only, since they measure through traffic destined to a user; however, they are not designed to perform active testing, wherein QoS parameters are evaluated for any predetermined configuration of services, therefore, there is the need to perform active testing of multiple services. Additionally, the presence of a receiving client rendering the service may affect the measurements, for example: in case of the receiver malfunctioning when multiple packets are lost at the receiver and requested to be retransmitted, i.e. the service performance is measured as affected by the client equipment.

When video flows are mixed with data and voice flows, network planning and engineering become even more challenging in terms of meeting the demands for the increase in bandwidth required to transport triple-play services. Complexity increases as new signaling protocols, such as Internet group management protocol (IGMP) for broadcast video and real-time streaming protocol (RTSP) for video on demand (VOD) services, are introduced. The dynamic nature of video flows is affected by viewing habits, channel changing loads, and dynamic VOD media requests. All of these factors add to the demands and complexity of delivering the required CoS.

U.S. Patent Applications 20030223376 published Dec. 4, 2003 in the name of Elliott et al. and 20040208129 published Oct. 21, 2004 in the name of Old et al. represent conventional systems for active testing of a network. In such systems, a test data generator generates traffic containing multiple streams associated with different services. Transmitted over the network, the traffic is then received by another apparatus and the quality of transmission is evaluated based on knowledge of the generated traffic. A variant of such systems is a single device, acting as the traffic generator and the receiver, accompanied by a loop cable within the network for reversing the traffic disclosed in.

While useful for pre-production testing, such systems would disrupt functionality of a network in production with their bulk traffic. Also, such systems do not perform testing of real life services provided by servers on the network, since there is a difference between testing a network capacity and a service. Of course, service performance depends on network capacity and is negatively affected by network bottlenecks. However, the service performance additionally depends on a service provider, its work load and configuration, and on the actual routes the flows take when the real service is tested. A traffic generator can not emulate the real service and actual routes taken by the real service flows.

It is known in the art of telecommunication to use apparatus that simulate client premises equipment. For example, U.S. Patent Application 20060067237 published Mar. 30, 2006 in the name of Burns et al. teaches a test apparatus that mimics a customer device and tests network connections between the service provider and the device.

U.S. Pat. No. 7,111,204 issued Sep. 19, 2006 in the name of Couturier et al. teaches a system for creating a plurality of 'synthetic users', each 'synthetic user' implementing a plurality of 'synthetic transactions' for cost and resource-effective load testing of a network server and the associated application services provided thereby and generate statistically-sufficient data. The system disclosed in the Couturier reference provides service testing, i.e. testing a capacity of the service provider; however, the Couturier system disrupts network traffic and does not test a service received by one particular user in real-life conditions of a deployed server in a production network.

It is an object of the present invention to overcome the shortcomings of the prior art and provide a device and a method for simultaneous testing multiple services received via a shared network access link.

SUMMARY OF THE INVENTION

Accordingly, the present invention provides a portable testing device for measuring an effect of a first service on a second service, both of which are delivered concurrently along with a third service via a shared network access link from a packet network, the first, second and third services having different service types selected from the group consisting of voice, video, and data. The device comprises: first signaling means for generating a first request for a change in the first service and sending the first request into the packet network; second signaling means for generating a second request for a change in the second service and sending the second request into the packet network; receiving means for concurrently receiving the first, second, and third services via the shared network access link from the packet network; measuring means for measuring a performance parameter of the second service; and test control means for controlling the first and second signaling means, and for controlling the measuring means for measuring the effect of the first service on the second service by measuring the performance parameter of the second service before and after the change in the first service.

The present invention provides a method for measuring an effect of a first service on a second service, both of which are delivered concurrently along with a third service via a shared network access link from a packet network, the first, second and third services having different service types selected from the group consisting of voice, video, and data. The method comprises the steps of: measuring a performance parameter for the second service to obtain a first value; generating a request for a change in the first service and sending the request into the packet network; concurrently receiving the first, second, and third services via the shared network access link from the packet network; measuring the performance parameter for the second service to obtain a second value; and comparing the first and second values to evaluate the effect of the first service on the second service.

In one embodiment of the present invention, a portable triple play services tester is provided for simultaneous testing of voice, video, and data services at the user premises.

BRIEF DESCRIPTION OF THE DRAWINGS

The invention will be described in greater detail with reference to the accompanying drawings which represent preferred embodiments thereof, wherein:

Figures 9, 10:
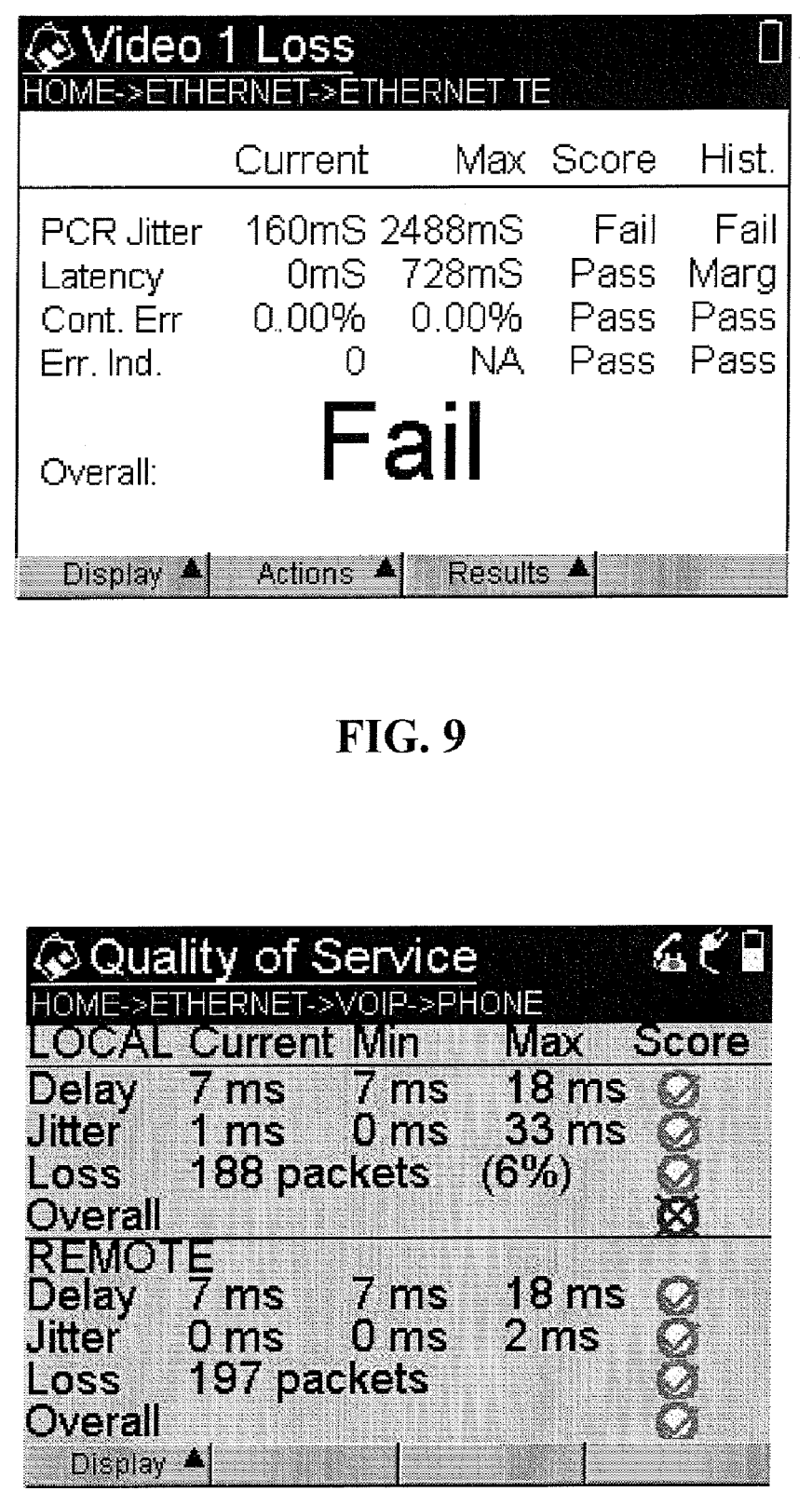

FIG. 9 is a screen output of the Video service QoS.

FIG. 10 is a screen output of the VoIP service QoS.

DETAILED DESCRIPTION

Figure 1A:
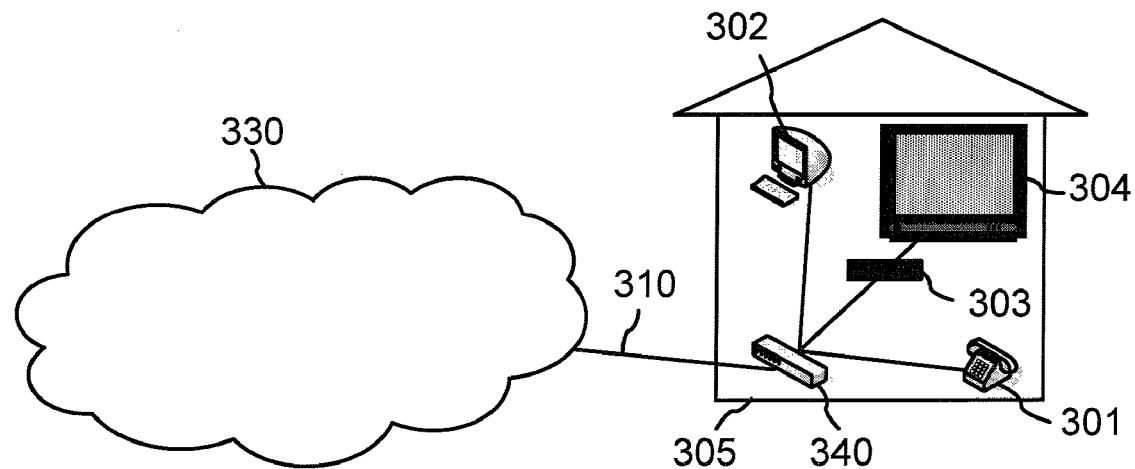
FIG. 1a is a schematic representation of a network, wherein a tester of the present invention can be used.
Figure 1B:
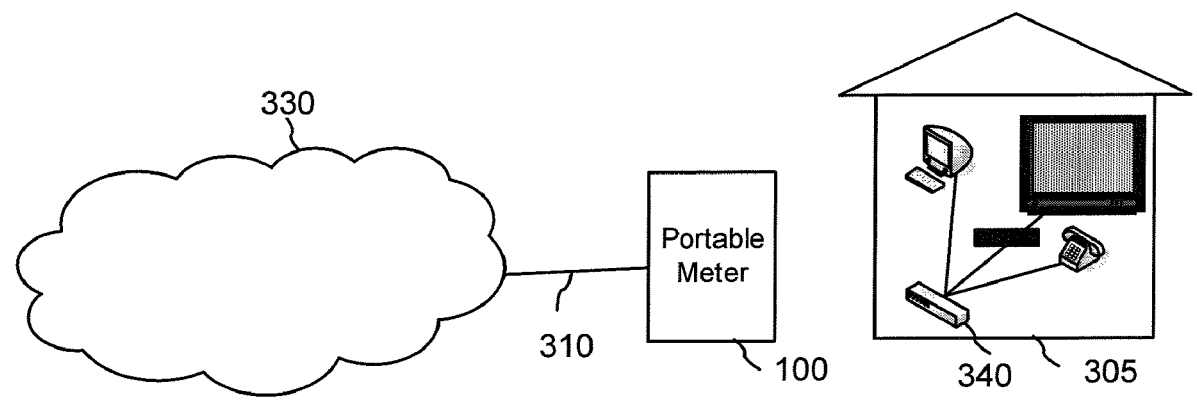
FIG. 1b is a schematic representation of the network shown in FIG. 1a, wherein a tester of the present invention is used in a termination mode.

Worldwide, service providers delivering multiple services over a converged carrier network need to cost effectively bulletproof the transport layer as well as ensure the quality of services, such as VoIP and IPTV. In reference to FIG. 1a, such services are delivered by the network 330 to equipment at user premises 305: an IP phone 301, a computer 302, a set-top-box (STB) 303, and a TV 304. These services are delivered via a shared network access link 310 and optional residential gateway 340, therefore the services share and compete for resources of the link 310, and thus affect one another. The in-home connections may be point-to-point connections, as shown in FIG. 1a, or connections over a LAN type network where the physical connect is shared, or wireless connections. In accordance with the present invention, a tester 100 measures mutual effect of two or more packet based services as shown in FIG. 1b, wherein the tester 100 is connected to the shared network access link 310 and simulates user premises equipment 301-304. Alternatively the tester 100 can be connected on the other side of the RG 340, or in absence thereof.

A service is understood as including a signaling packet flow and one or more content packet flows, such as video broadcast channels in a video service, or phone calls in a voice service, wherein each flow consists of one or more packet streams, for example for separate content delivery within a single channel flow. Initiation, modification, and termination of one flow or the whole service constitute a change in the service which may affect other services concurrently received via the shared link, wherein the term "concurrently" means that two consecutive packets associated with a first service can be separated by one or more packets associated with a second service.

Figure 2:
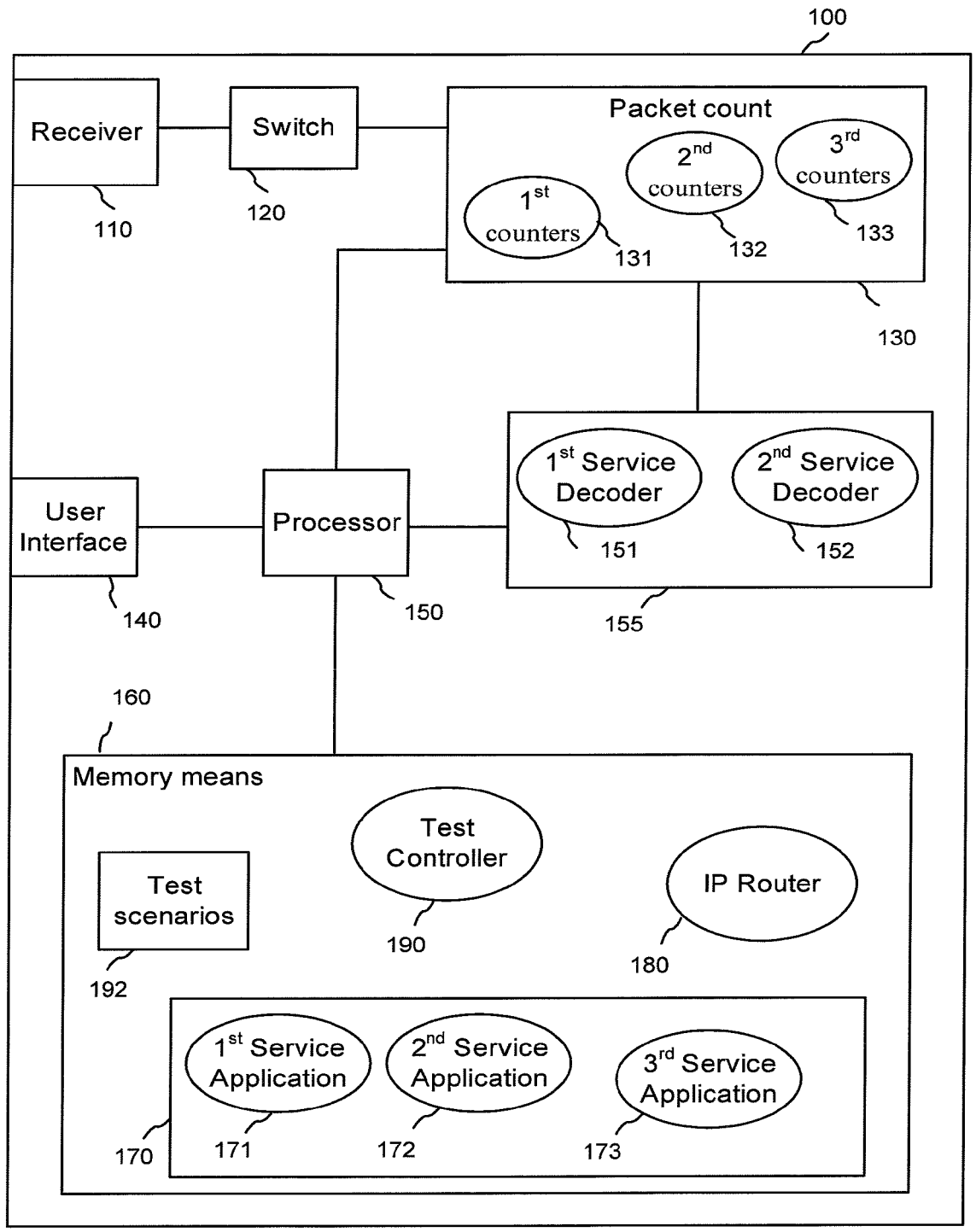
FIG. 2 is a schematic diagram of a tester in accordance with the present invention.

FIG. 2 is a schematic diagram of the tester 100, wherein each functional bloc may be implemented in hardware, firmware, software, or a combination thereof. The tester 100 includes receiving means 110 for connecting to a shared network access link 310, a switch 120 and a packet counting block 130 for separating and counting packets in non-IP media streams. The tester 100 also includes a user interface 140, a processor 150, and memory 160.

The receiving means 110 are implemented, for example, as an Ethernet interface or an xDSL modem, for concurrently receiving services via the shared network access link 310 from the packet network 330, wherein the network access link 310 is a 2-wire xDSL link or an Ethernet link. In one embodiment of the present invention, the receiving means 110 include more than one interfaces, such as Ethernet and xDSL, wherein only one interface is used in a particular time depending on the particular test environment. In one embodiment, the receiving means 110 include more than one physical ports, for example, if the access link 310 is a bonded DSL link, where two physical lines carry a combined flow using an inverse multiplexing technique. Alternatively, the receiving means 110 allow to access a Fiber to the Premise (FTTP) link at the Ethernet interface on the customer side of an Optical Network Termination (ONT) or Residential Gateway (RG).

Connected to the receiving means 110 is the switch 120 and the packet counting block 130 for separating and counting packets in layer 2 media streams delivering services. Implementation of such components is known to one skilled in the art; in particular, the switch 120 and the packet counting block 130 can be implemented in hardware, firmware, software, or any combination thereof.

The packet counting block 130 contains service specific components. In one embodiment of the present invention, in a tester designed for testing only services delivered by IP streams, components 120 and 130 are optional.

The processor 150 is a single dedicated processor or a plurality of individual processors for executing applications stored in the memory 160. The term "processor" should not be construed to refer exclusively to hardware capable of executing software, and may implicitly include, for example, digital signal processor (DSP) hardware. The memory 160 is any memory known in the art including, but not limited to, Random-Access Memory (RAM), Synchronous Dynamic Random Access Memory (SDRAM), Flash memory, read-only memory (ROM), non-volatile storage, or any combination thereof. Preferably, the user interface 140 includes a display and a keypad. Optionally, the user interface 140 includes a touch screen and/or a wireless/wireline connection.

The memory 160 stores an IP routing application 180 for routing IP packets to service applications 170 based on the destination IP address and the logical port number in the IP header. The test control means 190 controls all operations of the tester 100, including controlling signaling means and measuring means for measuring the effect of the first service on the second service by measuring a performance parameter of the second service before and after the change in the first service. Optionally, stored in memory 160 are test scenarios 192.

The service applications 170 include a first and second service applications 171 and 172 for emulation of particular services and measuring their performance parameters. Of course, more than two services can be supported by the tester 100 and any subset of these services can be tested simultaneously, but two services are sufficient for explanatory purposes. Optionally, the service applications 170 include a third service application 173. The service applications 171 and 172, and possibly 173, are executed simultaneously so that various test scenarios can be exercised.

Similarly, the packet counting block 130 contains service specific components: a first packet counting component 131 for testing a first service, a second packet counting component 132 for testing a second service, and an optional third packet counting component 133 for testing a third service.

Optionally, the tester 100 includes one or more decoders 155 for decoding received content streams. Preferably, the decoders 155 are implemented in hardware and/or firmware, the more efficient design than software-based decoders.

Each of the service applications 171-173 implements, at least partially, a known protocol suite for the corresponding service, together with a measuring block for calculating service-specific QoS parameters. The protocol suites used for delivery of services are generically broken into two categories, control plane protocols and data plane protocols. The control plane portion of the traffic is the signaling flow required to connect and maintain the data plane traffic consisting of one or more content flows.

By way of example, the first service application 171 supports testing of a voice service, such as VoIP. In reference to FIG. 3, the first service application 171 includes VoIP signaling component 171a, and a measuring component 171b, which together with the packet counting block 131 form measurement taker means associated with the first service measured by the tester 100 of the present invention, VoIP service in this exemplary embodiment. The measurement taker provides measurements of such performance parameters as a data rate parameter, a packet delay parameter, a packet loss jitter parameter, a packet loss parameter, a QoE parameter. The signaling component 171a is for generating requests for changes in the service, including its initiation and termination, and sending these requests into the packet network 330, as well as for receiving responses from the network 330.

The tester 100 of the exemplary embodiment supports the Real-Time Protocol (RTP) in the data plane and the Session Initiation Protocol (SIP) in the control plane. However, the Compressed Real-Time Protocol (cRTP) can be supported instead or together with the RTP, as well as other VoIP signaling protocols, such as H.323, SIP, SCCP, MGCP, MEGACO, TALI, SIGTRAN, and others. Any of these protocols can be implemented in the tester 100 of the present invention for simulating user premises equipment and requesting a service and/or any changes.

Figure 4:
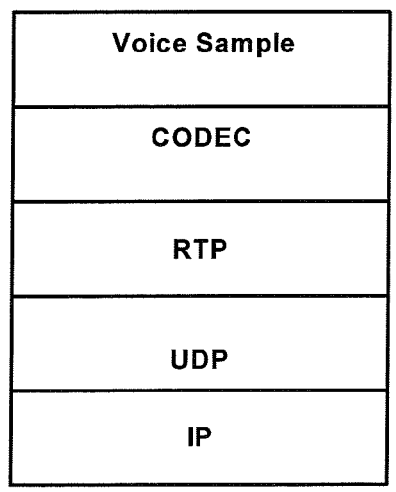
FIG. 4 is a diagram of the RTP protocol stack.

The RTP is commonly used in Internet telephony applications. Each RTP packet contains a small sample of the voice conversation. The size of the packet and the size of the voice sample inside the packet depends on the codec 151 used. FIG. 4 shows the RTP protocol stack. The RTP information is encapsulated in a UDP packet. If an RTP packet is lost or dropped by the network 330, it will not be retransmitted because a user would not want a long pause or delay in the conversation due to the network or the phones requesting lost packets.

The RTP combines its data transport with a control protocol (RTCP), which makes it possible to monitor data delivery for large multicast networks. Monitoring allows the receiver to detect if there is any packet loss and to compensate for any delay jitter. Both protocols work independently of the underlying Transport layer and Network layer protocols. Information in the RTP header tells the receiver how to reconstruct the data and describes how the codec bit streams are packetized. As a rule, the RTP runs on top of the User Datagram Protocol (UDP), although it can use other transport protocols.

The Session Initiation Protocol (SIP) is the session management protocol for multi-party multimedia sessions in the IP environment. It deals with the set-up, modification, and termination of the sessions. It also deals with supporting services such as establishment of a presence and locating users. SIP is an end-to-end protocol subscribing to a client-server architecture. The SIP end-point that initiates the session is the client, while the end-point receiving the invitation is the server.

The original SIP specifies a number of basic methods, or client requests: INVITE initiates or changes a session, ACK confirms a session establishment, BYE terminates a session, CANCEL cancels an impending invite, OPTIONS inquires capability, and REGISTRAR binds a permanent address to the current location. These methods are used by the first service signaling means for generating a request for a change in the first service, including its initiation and termination, and sending this request into the packet network.

The network can affect a VoIP call in different ways, for example by packet jitter, packet loss, and delay. Packet jitter is caused by changes in the inter-arrival gap between packets at the endpoint. The packets should arrive evenly spaced to allow for a seamless conversion into analog voice within the design limits of a given codec 151. If the packet gap exceeds the codec design limits, the user could experience degradation in quality. If the packet gap gets sufficiently large, the phone's packet jitter buffer will not be able to wait for the late packet, and the phone will drop the late packet. Packet loss is the actual loss of voice packets through a network. Packet loss is often caused by congestion at one or more points along the path of the voice call or by a poor quality link. Such VoIP performance parameters as packet jitter, packet loss, and delay are measured by the tester of the present invention. Other parameters can be measured as well, including, for example, the Mean Opinion Score (MOS) algorithms to estimate the user experience, or R-Factor analysis related to voice services, etc.

Multiple implementations of VoIP protocols are known in the art and commercially available for use as the protocol stack component 171a. The measurement component 171b implements methods for determining a quality of service parameters for a VoIP connection are also known in the art and disclosed e.g. in U.S. Pat. No. 6,888,801 issued on May 3, 2005 to Hock. The software measurement component 171b together with the hardware/firmware packet counting component 131 forms measuring means for measuring performance parameters of the VoIP service. Key performance parameters include packet loss, packet jitter, packet delay, MOS score and R-Factor. Identification of the codec, whether a G.711, G.723, G.726, or G.729 codec, etc., used for the call under test, is also important, since it sets the "possible" quality as measured by the MOS score.

By way of example, the second service application 172 supports testing of a video service, such as the BTV service.

Figure 3:
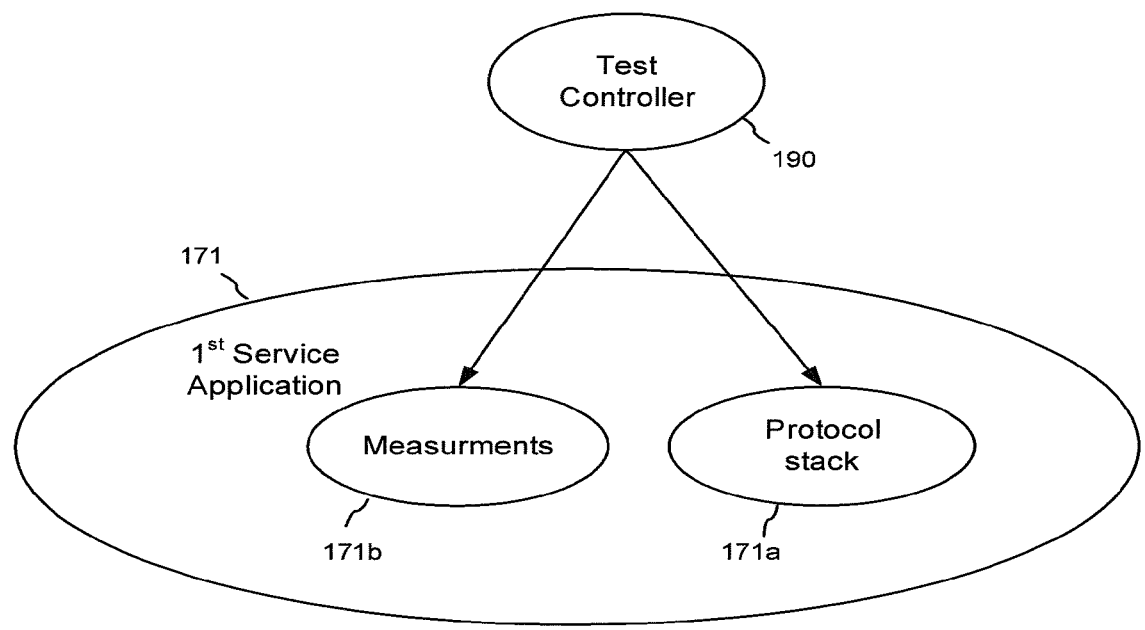
FIG. 3 is a block schema of VoIP service application.

Similar to what is shown in FIG. 3, the second service application 172 includes a BTV signaling component, and a measuring component, the latter together with the packet counting block 132 forms measurement taker means associated with the second service measured by the tester 100 of the present invention, the BTV service in this exemplary embodiment. The measurement taker provides such measurements as a data rate parameter, a packet delay parameter, a packet loss jitter parameter, a packet loss parameter, a QoE parameter. The signaling component within the second service application 172 is for generating requests for changes in the service, including requests for its initiation and termination, and sending these request into the packet network, as well as for receiving responses from the packet network.

The second service application 172 emulates the STB 303 receiving a packet flow containing video material transported in either RTP or UDP packets. The broadcast video "channel", or flow, includes video content, audio content, and data for program and access control, etc. This material is encoded and packetized into "Packetized Elementary Streams" (PES) typically sent to the user premises in an MPEG transport stream (MPEG-TS) delivered via an IP Multicast in case of live TV or via an IP Unicast in case of Video on Demand. MPEG-TS allows multiplexing of digital video and audio content and synchronization of the output.

The BTV application 172 has a signaling component implementing the Broadcast Video program signaling protocol IGMP, used to access broadcast video services that use a multicast network design to efficiently manage network bandwidth. IGMP enables each STB to obtain only the programming that the viewer is interested in watching, conserving bandwidth in the access network. In this implementation, a JOIN message is sent from the tester 100 to the network 330. The JOIN message asks the network 330 to send the requested program/channel to the tester 100 by joining a multicast group carrying the desired broadcast channel. IGMP latency is the period between the time the join message is sent and the time the first video packet is received by the tester 100. Thus, IGMP latency is a measure of both service provisioning and the network's response performance. These messages travel upstream into the network 330 to the first device that can add (join) the requestor to an existing broadcast channel flow. This parameter measures network performance, but not the end user's experience, with regard to channel changing time. The IGMP latency plus the time it takes to fill the decode buffer and to decode and display the content is the total user experience time. However, the buffer fill time and the decode time are functions of the network architecture and are not variables. Thus, the measurement of the variable network performance aspect of IGMP latency is the critical parameter for measuring actual network performance.

Channel changing is accomplished by sending IP datagrams to the head end system which then can change the streams assigned to the far end IP address, e.g. at the customer premises 305. The TV remote "click" is converted to one of these datagrams carrying the "join a stream message, or leave a stream message" to change selections. To select a new channel, the tester 100 sends a message to the IGMP server. The message is actually addressed to the IP address of the multicast group (i.e. channel) that the tester 100 wishes to join. The IGMP Server arranges for the channel currently being transmitted to be disconnected and the new channel to be connected.

Figure 5:
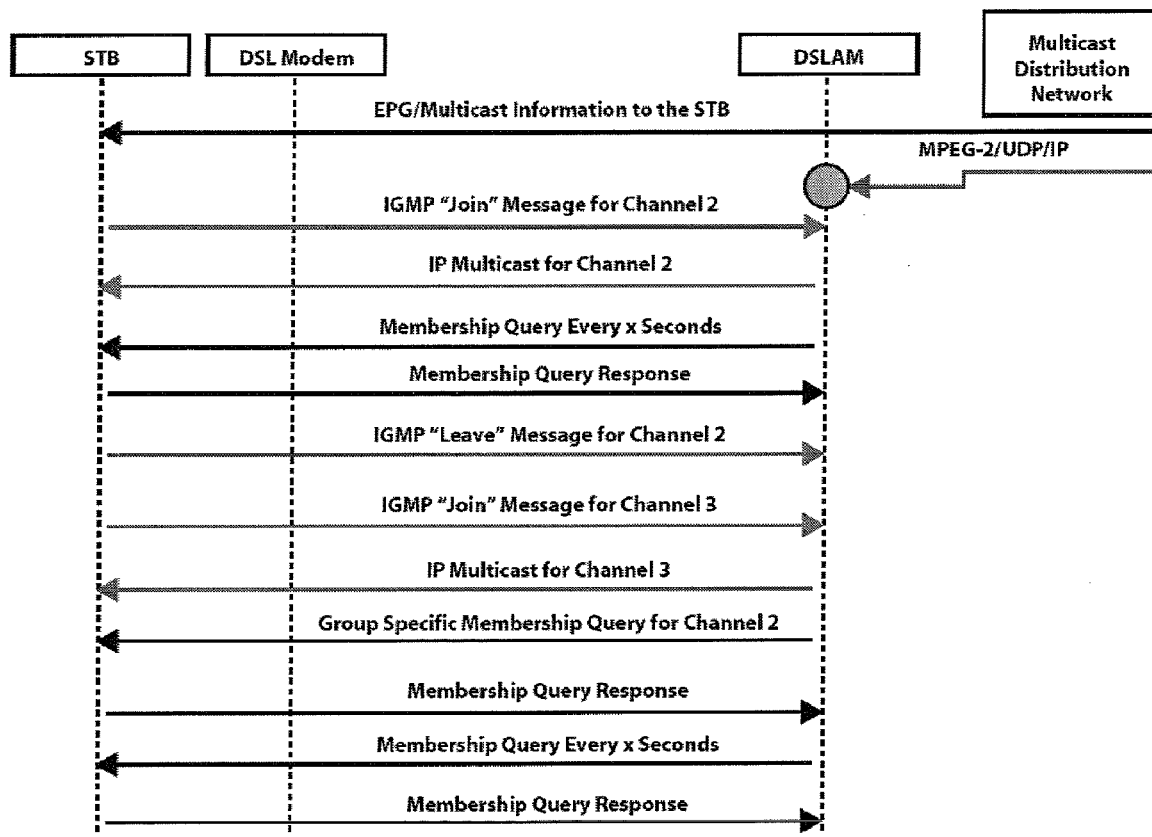
FIG. 5 shows an example of an IGMP message flow.

The IGMP is the signaling means used for generating a request for a change in the second service, including its initiation and termination, and sending this request into the packet network. An example of an IGMP message flow is shown in FIG. 5, wherein a broadcast program, Channel 2, is requested and then a channel change to another program, Channel 3, is requested.

There are two critical source quality parameters that can be measured in MPEG-2 transport stream video flows at the customer premises 305 and/or in the last-mile access network: program clock reference (PCR) jitter and the video transport packet error indicator count. In MPEG-4, the former parameter is replaced by Object Clock Reference (OCR). Network performance is another determinant of video quality. It can be measured in a few performance parameters: Packet loss, Packet jitter, IGMP latency. Each of these parameters can be analyzed at the customer premises 305 or in the last-mile access network. Software measurement component, similar to the measuring component 171b shown in FIG. 3, together with the hardware/firmware packet counting component 132 forms measuring means for measuring performance parameters of the BTV service. Key performance parameters include Continuity error rates, PCR jitter, PAT and PMT error condition and repetition rates, error indicator count, etc. as outlined in ISO/IEC 13818, page 41, and ETSI TR 101 290, pages 17-19.

The tester 100 of the exemplary embodiment supports the BTV service using RTP and IGMP protocols. However, other protocols, such as the Multicast Listener Discovery (MLD) Protocol, can be implemented in the tester 100 of the present invention for simulating user premises equipment 301-304 and requesting changes in a video service. In one embodiment, the tester of the present invention includes a hardware based decoder 152 for MPEG-4 systems.

Alternatively, the second service application 172 emulates Video on Demand (VOD) service.

The signaling protocol for video on demand (VOD) service, real-time streaming protocol (RTSP), enables DVD-style control over a multimedia stream and allows users to play, pause, and stop the program they are watching. The protocol stack is similar to IGMP: IP/UDP/MPGE-2. The message flows are similar to IGMP also, but use selectable media address entries, generate client requests for access to VOD media servers instead of "joins" and "leaves" to a group as done in IGMP. For the VOD service, the following parameters define video QoS: PCR jitter (level), Continuity error (rate), and Error indicator (count).

The tester of the present invention has routing/switching means for dividing the total flow of packets received by the tester 100 into streams corresponding to different services. In one embodiment of the present invention this component includes the IP routing means 180 for routing IP packets to the service application based on the destination IP address and logical port number in the header of an IP packet. In another embodiment, switching of Layer 2 streams is performed in hardware by the switch 120. In yet another embodiment, both Layer 2 switching means 120 and Layer 3 routing means 180 are present within the tester 100.

Each service provided by a network is associated with a user IP address. For a service delivered by IP-based media stream(s), it is a destination IP address. For a service delivered by media stream(s) based on Layer 2 protocol, for example a service using PPP packets, the IP address associated with this service is the address of the signaling application which requests this service from the service provider, negotiates delivery parameters, etc.

Typically, each client device on user premises is assigned an IP address by the network. Thus, in one embodiment of the present invention the tester 100 supports two or more IP addresses at the same time. In operation, the service applications 170 communicate with the network to establish service connections and receive an IP address assignment for each application required by a test scenario. Alternatively, a static address assignment can be implemented in the tester 100. In one embodiment, the tester 100 emulates at least some of the RG 340 functionality and receives all the services at a single IP address associated with the RG 340.

In one embodiment, the tester 100 supports three MAC addresses, for example a MAC address for the STB 303, a Network Interface Card (NIC) of the PC 302, and a VoIP phone device 301. In another embodiment the tester 100 is capable of receiving more than two services at the same MAC address and separate packet flows by VLAN tags and/or IP destination addresses, for example in a network where separate VLAN's are used to separate services all the way to the end points, STB, PC, VoIP phone, possibly including separate VLAN's for signaling and data planes.

The test controller 190 performs control functions to mange various test sessions and implement test sequences based upon tester configuration entries for each triple play application and direct input from the user interface 140. For example, the user manually enters desired test sequences or activates a script providing commands to the controller to run pre-programmed test sequences, such as: signal for a video program 1, signal for a VoIP call 1, establish an ftp session, measure key parameters, signal for a second video program, measure key parameters again, and analyze the combined set of parameters.

In operation, a technician performing the testing chooses one from the pre-configured test scenarios 192 via the user interface 140, or dynamically provides information about which services from the supported set of services should be tested together and which parameters should be measured. The test controller 190 receives information provided by the user via the user interface 140, optionally accesses the test scenarios 192 in memory 160, and invokes applications for services requested to be tested. By way of example, if VoIP and IPTV services are being tested, the processor 150 executes the first service, e.g. VoIP, application 171 and the second service, e.g. IPTV, application 172. Typically the MAC addresses of the STB and IP phone are provided via the user interface 140 as part of the tester set-up. Once the tester 100 is "registered" it can emulate the STB and IP phone.

Figure 6:
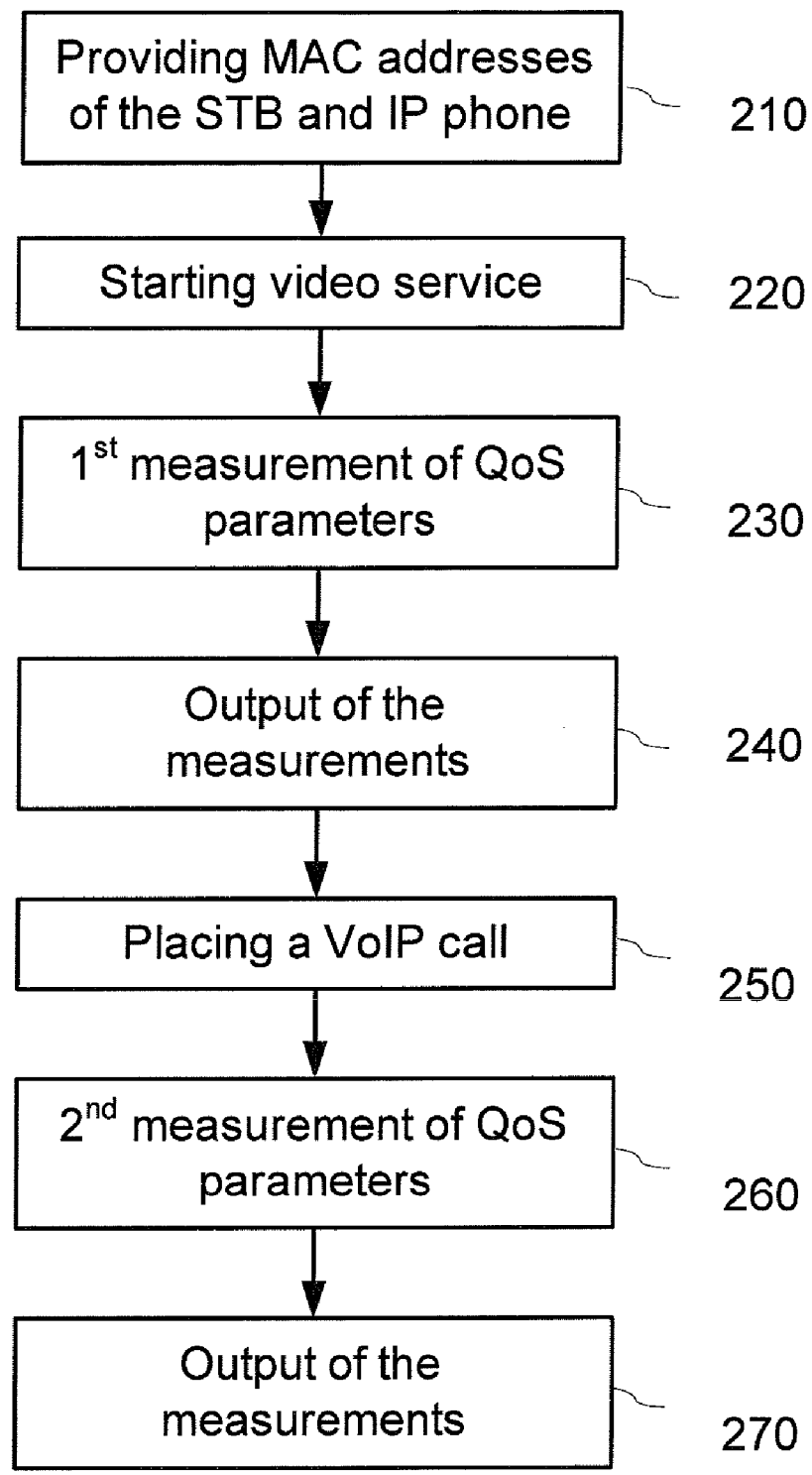
FIG. 6 is a block schema of a particular testing scenario.

FIG. 6 is a block schema of a particular scenario wherein tested is an effect of a VoIP call on a BTV service already running when the phone call is placed. In step 210 testing scenario is specified and necessary parameters are provided; then the BTV service is started 220 and JOIN message is used to request a particular channel; of course, more than one channel may be requested. After, measuring and displaying QoS parameters of the BTV service in steps 230 and 240, a VoIP call is placed 250. Measurements of changed BTV streams are taken and displayed for comparison in steps 260 and 270. Alternatively, or additionally, to displaying the QoS parameters measured before and after placing a phone call, their difference is displayed making it is easier to notice if the BTV service has deteriorated. In general, typical negative impact is associated with packet loss and packet jitter for the existing VoIP call when additional services are brought on line.

Another scenario includes bringing up a single video program and an ftp data test session. Then bringing up additional video programs and analyzing the behavior of the ftp throughput data rates as additional bandwidth is taken by the video services.

Figure 7:
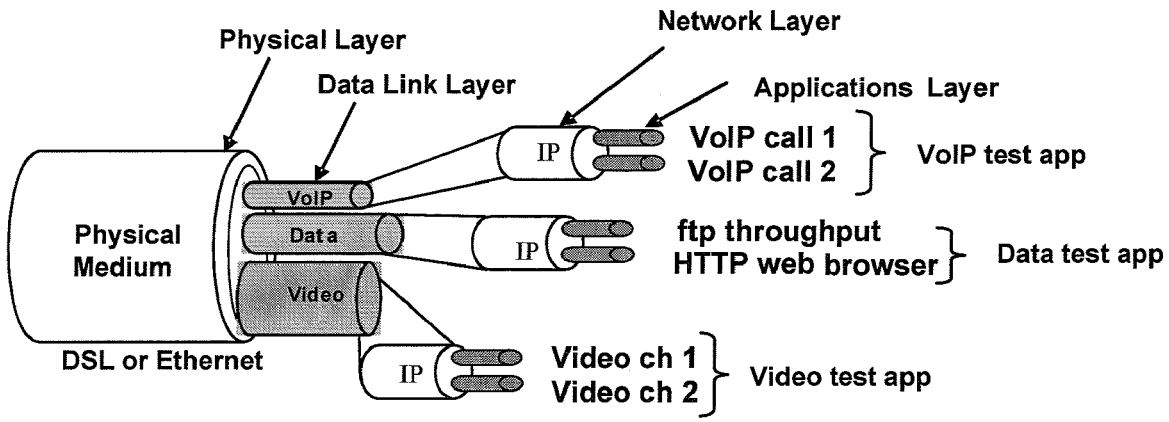
FIG. 7 is a schematic representation of the packet flows received by the tester.
Figure 8:
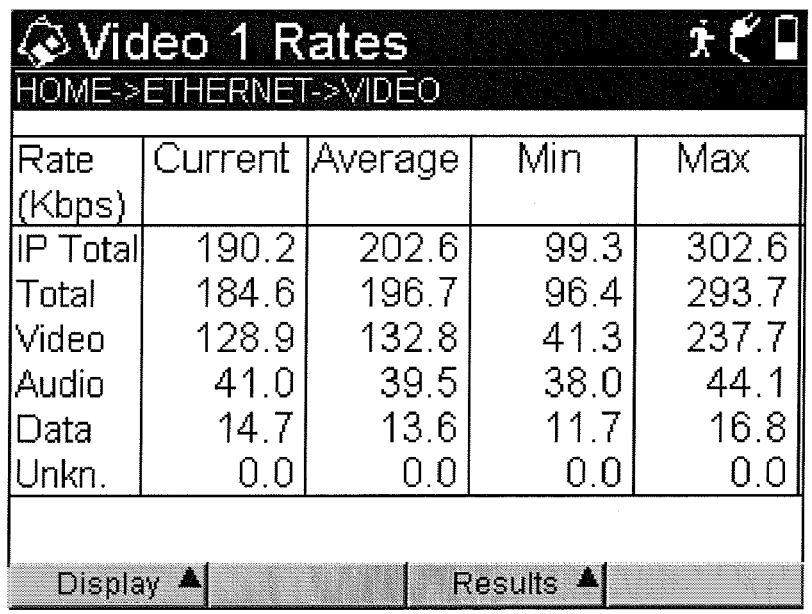
FIG. 8 is a screen output of the combined bandwidth usage for a broadcast video channel.
Figure 11:
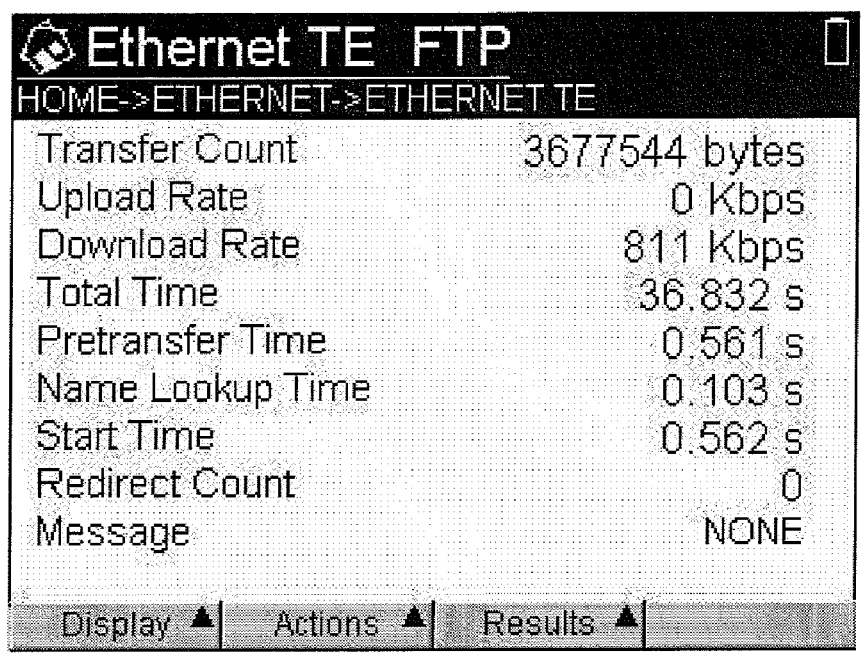
FIG. 11 is a screen output of the Data service QoS.

In reference to FIG. 7, an exemplary packet flow received over a physical layer, e.g. a DSL or Ethernet cable, at the receiving means 110 of the tester 100, consists of three different services, e.g. VoIP, Data and Video, at the data link layer, transmitted in internet protocol at the network layer, and includes two channels of a video service, two VoIP calls, and two data streams: for FTP service and a web browser at the application layer.

Figure 12:
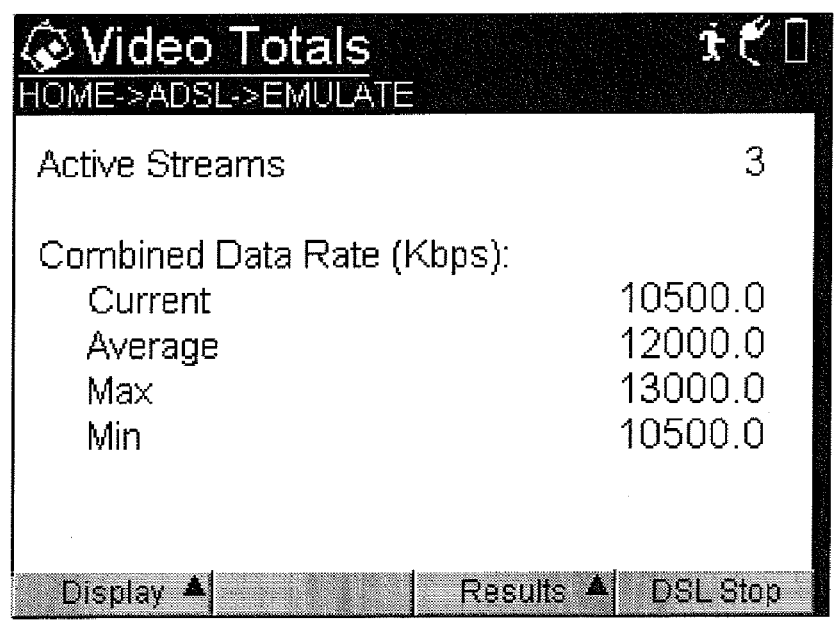
FIG. 12 is a summary screen output.

The test results screens shown in FIGS. 8-11 are examples for each of the applications. The data on each screen is captured simultaneously. Each screen is viewed individually for easy access to each service and focus particular QoS details. Since displays on portable test tools are small, not all data can be displayed on one screen. However, summary screens showing combined data flows statistics are also included. For example, a summary screen in FIG. 12 shows analysis of 3 streams. Additional screens show combined data rate flows for all test streams.

Various embodiments of the present invention support VoIP, BTV, VOD, Interactive TV, Digital Video Broadcasting (DVB), as well as internet data services such as FTP. The particular services are named herein for illustration purposes only and different embodiments of the present invention can measure other services or support other protocols, not mentioned herein. By way of example, instead of RTP, the data plane of the tester 100 of the present invention can employ cRTP or MPEG-4 mapped directly to RTP packets without using the MPEG-2 Transport Stream format for video streams. In various embodiments, the protocol stack of the tester includes use of VLAN tagging, PPPoE sessions establishment or Virtual Channel assignments at the DSL interface, or any of combination of the above.

In one embodiment of the present invention, the tester 100 supports at least two services and capable of evaluating their mutual effect, wherein a first measurement taker measures the effect of the first service on the second service, and a second measurement taker measures an effect of the second service on the first service.

In one embodiment of the present invention, the tester 100 is a triple play services tester supporting concurrent testing of VoIP, IPTV, and internet data services, for example email, file transfer, messaging, etc, as shown in FIG. 1b. The triple play services meter includes three measurement takers for simultaneously measuring the effects on each of the first, second and third services provided by the two other services.

Figure 13:
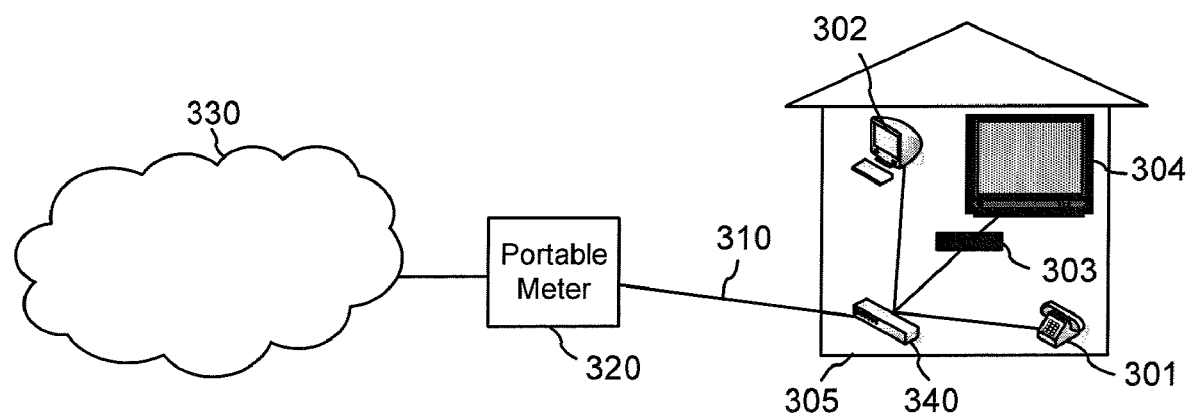
FIG. 13 is a schematic representation of the network shown in FIG. 1a, wherein a tester of the present invention is used in a through mode.

In one embodiment of the present invention, the tester 100 can do both active testing, i.e. simulating an STB and IP phone and requesting services from the network, and passive testing, i.e. monitoring services established by the user-premises devices 301-304, as shown in FIG. 13. To enable the passive monitoring mode, the tester 320 has an additional user port, not shown in FIG. 2, for connecting to the user-premises devices 301-304. For example, the tester 320 can be configured to monitor the BTV service established by the STB 303 and simulate VoIP calls, or vise versa. As an alternative to the configuration shown in FIG. 13, the tester 320 in monitoring mode may replace the RG 340 and emulate its functionality.

Figure 14:
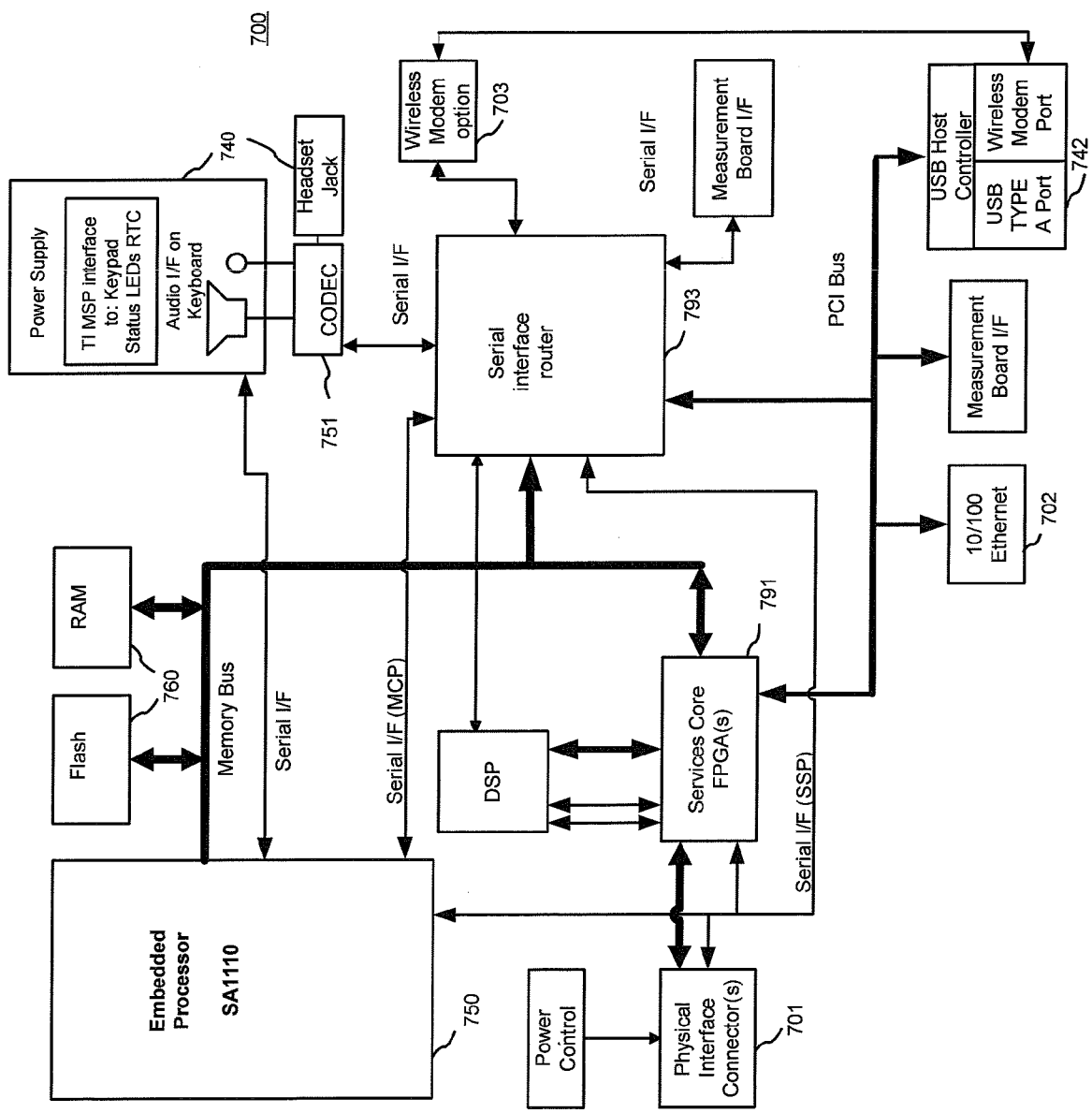
FIG. 14 is a schematic diagram of a tester in accordance with one embodiment of the present invention.

One embodiment of the present invention is discussed hereinbelow in reference to FIG. 14. A tester 700 has user interface 740 including a keypad, status LEDs, a wireless connection 703, and an LCD display, not shown. When a technician initiates a test by providing configuration parameters through the user interface 740, a processor 750, for example an INTEL SA1110 processor, executes service applications stored in memory 760 to generate service request messages to be send to service provides via the network access link 310.

The tester 700 has two ports for connection to the network access link 310: an Ethernet port 702 and ad logic level interface 701. In operation, the network access link is connected to one of the ports 701 and 702.

If a multi-service packet flow is received via the port 701, the packets are passed through a service core 791 an a digital bus to the processor 750, which, in particular, separates a voice stream from video and data application streams and routes it to a codec 751. The measurement results produced by the processor 750 are provided to the user via the user interface 740. In addition, the test results can be stored in the 760 memory or exported to the USB port 742 for processing by a given USB device. Furthermore, they can be exported from the tester 700 over the Ethernet I/O block 702. Port 703 is an optional port for a wireless modem which can also be to export test data to another device like a laptop.

If the multi-service packet flow is received via the wireless port 703 or Ethernet port 702, the data packets are routed through a serial interface router 793 to the processor 750.

Advantageously, the tester of the present invention can execute two or more service emulating applications simultaneously and analyze these services in parallel, for example receiving 3 multicast TV channels, 2 IP calls and a data stream. In one embodiment, each of the service applications is associated with its own IP address. In another embodiment, each of the services is associated with its own MAC address.

Advantageously, the tester of the present invention enables verification of Class of Service (COS) policies employed by service providers. COS is a form of priority queuing by classifying and prioritizing packets based on application type (e.g., voice, video, file transfers, and/or transaction processing, etc.), the type of user (e.g., CEO, secretary, and/or sales engineer, etc.), and/or other settings. COS can classify packets by examining packet parameters and/or COS markings and/or can place packets in queues of different priorities based on predefined criteria. Low-priority traffic can be "drop eligible," while high-priority traffic can get the best available service.

In this context, COS refers to the prioritization given to individual application flows and the control of dynamic bandwidth utilizations. Since each of the individual application can be controlled by the tester, such as adding more video flows by setting up additional video programs or additional voice calls, typical, mixed service use cases can be explored. Service agreements can be verified and fault conditions identified in a mixed service environment, which is not possible when only one application at a time is tested. This capability in a portable field tool can greatly reduce trouble-resolution times.

Advantageously, the tester of the present invention can be used for turning up services at user premises as well as for trouble-shooting already deployed services.

I claim:

1. A portable testing device for measuring an effect of a first service on a second service, both of which are delivered concurrently along with a third service via a shared network access link from a packet network, the first, second and third services having different service types selected from the group consisting of voice, video, and data, the device comprising:
   first signaling means for generating a first request for a change in the first service and sending the first request into the packet network;
   second signaling means for generating a second request for a change in the second service and sending the second request into the packet network;
   receiving means for concurrently receiving the first, second, and third services via the shared network access link from the packet network;
   measuring means for measuring a performance parameter of the second service; and
   test control means for controlling the first and second signaling means, and for controlling the measuring means for measuring the effect of the first service on the second service by measuring the performance parameter of the second service before and after the change in the first service.

2. The device as defined in claim 1, further comprising memory means for storing a first Internet Protocol (IP) address and a second IP address different from the first IP address, wherein the first signaling means receives a first response from the packet network at the first IP address; and wherein the second signaling means receives a second response from the packet network at the second IP address.

3. The device as defined in claim 2, further comprising: a third signaling means for generating a third request for a change in the third service and sending the third request into the packet network; wherein the receiving means also receives the third service concurrently with the first and second services via the shared network access link from the packet network; and wherein the measuring means measures an effect of the change in the first and third services on the second service.

4. The device as defined in claim 3, wherein the memory means store a third IP address, and wherein the third signaling means receives a third response from the packet network at the third IP address.

5. The device as defined in claim 1, wherein the measuring means comprises: a first measurement taker for measuring the effect of the first service on the second service, and a second measurement taker for measuring an effect of the second service on the first service.

6. The device as defined in claim 5, further comprising a third measurement taker for measuring an effect of the changes in the first and second services on the third service.

7. The device as defined in claim 6, wherein the test control means supports simultaneous measurements the effects on each of the first, second and third services provided by the change in the two other services.

8. The device as defined in claim 1, wherein the performance parameter is selected from the group consisting of a data rate parameter, a packet delay parameter, a packet loss jitter parameter, a packet loss parameter, and application specific Quality of Service (QoS) parameters.

9. The device as defined in claim 1, wherein the second service is a video service.

10. The device as defined in claim 1, wherein the test control means are for validation of the class-of-service (CoS) mechanisms provided by the packet network via a shared network access link.

11. The device as defined in claim 10, wherein the test control means provides validation of a first CoS mechanism associated with the first service and a second CoS mechanism associated with the second service.

12. The device as defined in claim 1, further comprising a user port for connecting to a user device so as to monitor a packet flow between the packet network and the user device, wherein the test control means disable the second signaling means.

13. The device as defined in claim 1, wherein the first, second, and third services are triple play services.

14. A method for measuring an effect of a first service on a second service in a portable testing device, both of which are delivered concurrently along with a third service via a shared network access link from a packet network, the first, second and third services having different service types selected from the group consisting of voice, video, and data, comprising the steps of:

measuring, in said device, a performance parameter for the second service to obtain a first value;

generating a request, in said device, for a change in the first service and sending the request into the packet network;

concurrently receiving, in said device, the first, second, and third services via the shared network access link from the packet network;

measuring, in said device, the performance parameter for the second service to obtain a second value; and comparing, in said device, the first and second values to evaluate the effect of the first service on the second service.

* * * * *